DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 15, 1972

901 O.G. 778

T901,030
BATTERY CONTAINER COMPOSITION AND PROCESS

Marlin R. Long, Ringwood, N.J., assignor to Texas-U.S. Chemical Company, Parsippany, N.J.

Filed May 7, 1971, Ser. No. 141,439
Int. Cl. C08c *11/18*
U.S. Cl. 260—41.5
No Drawing. 22 Pages Specification

Containers for lead-acid type storage batteries are made from a composition which cures to produce a vulcanizate with a desirable combination of impact resistance and stiffness. It is useful for various battery containers and especially for thin wall storage batteries for automobiles. The composition includes as an essential ingredient a resin and elastomer blend containing between 40 and 90 parts of an elastomeric base polymer and between 10 and 60 parts of a reinforcing resin selected from the group consisting of polystyrene and styrene-butadiene copolymer resins containing at least 60% styrene units in the polymer chain. The container composition is compounded by mixing with the resin-elastomer blend a filler, vulcanizing agent, conventional compounding agents, and mold lubricants. The resulting mixed stock is preferably granulated to produce grains of one-half inch or less in their largest dimension. The granules are then introduced into the battery case mold where the composition is cured at about 365° F.